(12) United States Patent
Van Noetsele

(10) Patent No.: US 8,132,223 B2
(45) Date of Patent: Mar. 6, 2012

(54) DISPLAY OF ENHANCED CONTENT

(75) Inventor: Robert Van Noetsele, Middelbeers (NL)

(73) Assignee: UPC Broadband Operations BV, Schiphol-Rijk (NL)

( * ) Notice: Subject to any disclaimer, the term of this patent is extended or adjusted under 35 U.S.C. 154(b) by 1387 days.

(21) Appl. No.: 10/383,928

(22) Filed: Mar. 7, 2003

(65) Prior Publication Data

US 2003/0200554 A1    Oct. 23, 2003

(30) Foreign Application Priority Data

Mar. 7, 2002    (GB) .................................. 0205400.5

(51) Int. Cl.
*H04N 7/16*    (2011.01)
(52) U.S. Cl. ......................... 725/135; 725/112; 725/113
(58) Field of Classification Search .................... 725/86, 725/90–91, 95, 100, 118, 120, 131, 144–147
See application file for complete search history.

(56) References Cited

U.S. PATENT DOCUMENTS

| | | | | |
|---|---|---|---|---|
| 4,230,990 | A * | 10/1980 | Lert et al. ......................... | 725/22 |
| 5,532,735 | A * | 7/1996 | Blahut et al. ..................... | 725/32 |
| 6,006,257 | A * | 12/1999 | Slezak ............................ | 725/110 |
| 6,020,912 | A * | 2/2000 | De Lang ......................... | 725/91 |
| 7,013,479 | B2 * | 3/2006 | Mori .............................. | 725/93 |
| 7,028,327 | B1 * | 4/2006 | Dougherty et al. ............. | 725/93 |
| 2002/0059644 | A1 * | 5/2002 | Andrade et al. ............... | 725/136 |
| 2002/0083464 | A1 * | 6/2002 | Tomsen et al. ................. | 725/112 |
| 2002/0133817 | A1 * | 9/2002 | Markel ........................... | 725/23 |
| 2002/0144260 | A1 * | 10/2002 | Devara ........................... | 725/32 |
| 2002/0191954 | A1 * | 12/2002 | Beach et al. .................... | 386/46 |
| 2003/0023970 | A1 * | 1/2003 | Panabaker ...................... | 725/32 |
| 2003/0084453 | A1 * | 5/2003 | Laughlin et al. ................ | 725/60 |
| 2003/0189668 | A1 * | 10/2003 | Newnam et al. ............... | 725/135 |
| 2005/0015815 | A1 * | 1/2005 | Shoff et al. .................... | 725/135 |

FOREIGN PATENT DOCUMENTS

| | | |
|---|---|---|
| EP | 0852443 A2 | 7/1998 |
| EP | 0915621 A2 | 5/1999 |
| EP | 1304877 A1 | 4/2003 |
| WO | WO-01/72040 A2 | 9/2001 |
| WO | WO-01/82623 A2 | 11/2001 |
| WO | WO-02/19715 A2 | 3/2002 |

* cited by examiner

*Primary Examiner* — Brian Pendleton
*Assistant Examiner* — Fernando Alcon
(74) *Attorney, Agent, or Firm* — Harrington & Smith

(57) ABSTRACT

A method for controlling presentation of items of enhanced content in an interactive television system comprising at least one distribution unit and a plurality of decoder units arranged to store items of enhanced content and cause them to be presented to a user on receipt of a trigger signal from the distribution unit, the method comprising: storing the items of enhanced content at the decoder units; storing at the distribution unit a schedule indicating a desired synchronisation between the items of enhanced content and a running program with which the enhanced content is associated, the running program comprising a timing stream and a series of periodic indications of the identity of the running program; transmitting the running program to the decoder units over a transmission channel via the distribution unit; and at the distribution unit analysing traffic passing over the transmission channel so as to determine whether the said periodic indications of the identity of the running program continue to be detected as passing over the transmission channel, and generating trigger signals in respect of the enhanced content associated with the running program only whilst it is determined that the said periodic indications continue to be detected as passing over the transmission channel.

17 Claims, 4 Drawing Sheets

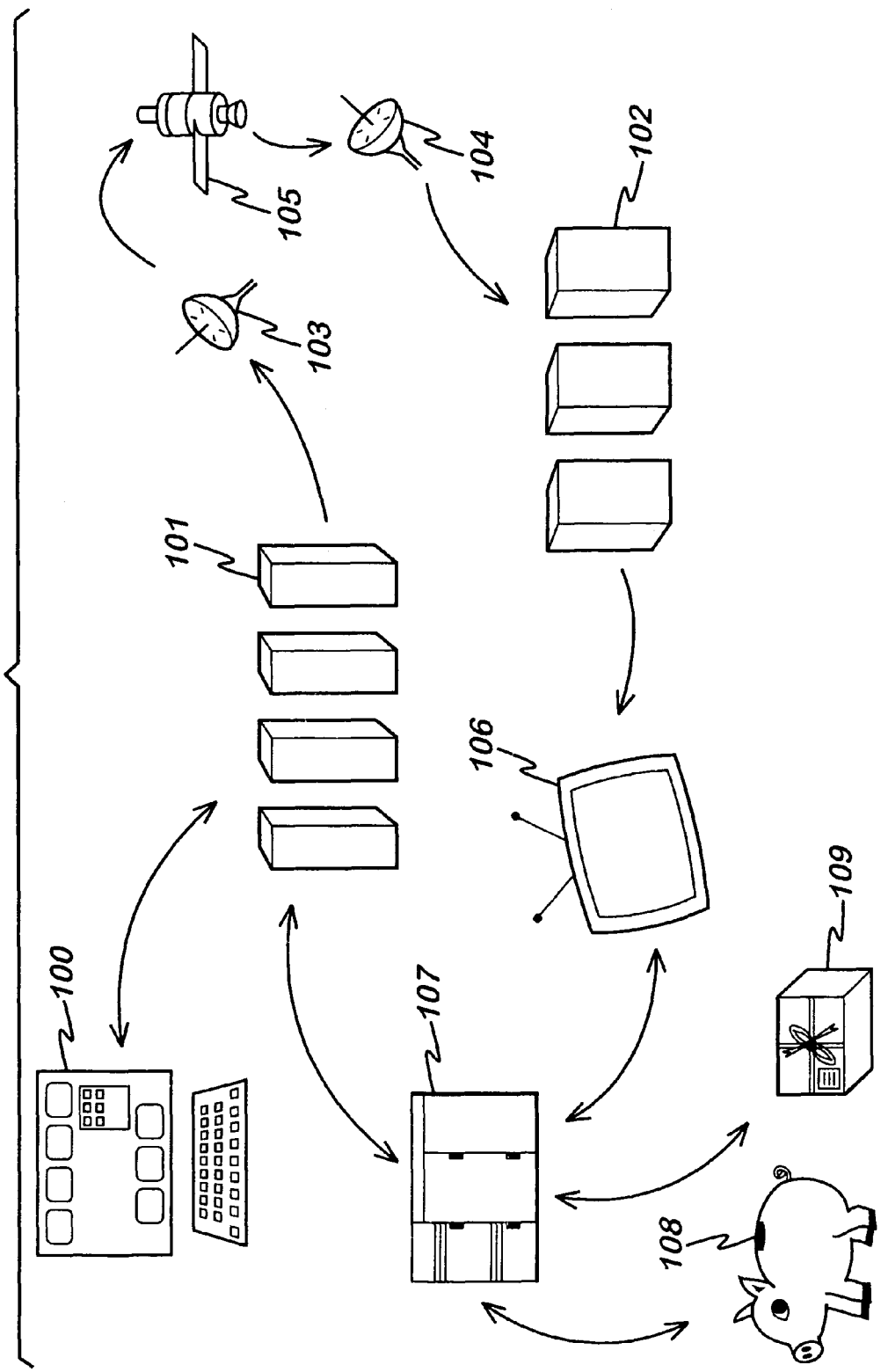

DISPLAY OF ENHANCED CONTENT

This invention relates to interactive television systems, and in particular to the display of enhanced content in interactive television systems.

A prior art interactive television system is shown generally in FIG. 1. The system includes a digital video data provider 1, decoders 3a-c for converting the digital video data to an analogue format, a television 5 at each decoder for displaying the video data, and enhanced content transmitted over a network 2. In current systems, the enhanced content is transmitted to decoders, or set-top boxes (STBs), which then display pages of enhanced content on a television. A user input device 4 is provided at each decoder 3a-c so that a user can adjust settings of the decoder and/or the television 5 and respond to queries or questions in the enhanced content. The user input device 4 could, for example, be a keypad or remote control.

The enhanced content is typically content available to be displayed at the direct or indirect request of a user onto a television screen. The enhanced content is typically in addition to the basic A/V data of a television program or movie. It may consist of information, such as news, television schedules, or weather reports, or may invite a response from a user.

Enhanced content may be transmitted over a network independently of A/V data, or alternatively may be embedded in the A/V data.

The term "interactive television" suggests that a viewer can provide input to the system, for example to respond to queries within the enhanced content or to control the video stream that he receives. An example of a user input/response is an answer to a question posed in the enhanced content (or interactive content). If the video content being displayed on a television is, for example, a quiz show, it may be desirable to provide interactive content consisting of quiz questions corresponding to those being asked in the quiz show.

FIG. 2 shows in more detail the decoding arrangement of a prior art interactive television system. A network 2 provides decoder 3 with a stream of enhanced content 8, together with an indication of the required flow of that content. The flow will normally be indicated by reference to a video stream that that enhanced content accompanies. The enhanced content 8 is inputted to a formatting unit 9 for formatting its input signal into a series of pages 10a-d of enhanced content for display on television 5.

Each page 10a-d could have associated with it a time at which it is to be displayed on the television. In this implementation, referring to the example shown in FIG. 2, the pages 10a-d are associated with a television program which commences at 16.30. The first page, 10a, is to be displayed at 16.31. The second page, 10b is to be displayed at 16.32, and 10c and 10d are to be displayed at 16.38 and 16.40 respectively.

This arrangement has a number of disadvantages. Firstly, the broadcast schedule must be known by the provider of enhanced content in advance of the transmission of the stream of enhanced content 8. In this way, the time at which each page of enhanced content is to be displayed can be embedded into the stream 8 before transmission. In addition to the enhanced content provider requiring information regarding the start time of each television program for which it is providing enhanced content, it also needs information on the timing of any scheduled intermissions in each program.

Secondly, this arrangement for the display of enhanced content is incapable of making adjustments to accommodate changes to the advertised broadcast schedule. Similarly, the arrangement cannot accommodate unadvertised intermissions in the broadcast. These could occur if the broadcast has to be interrupted for some reason. Also, if the broadcast is to be interrupted by advertisements the position and duration of the advertising breaks must be taken into account when the enhanced content is set up. If the broadcast is to be shown on a number of channels which have different advertising schedules then the enhanced content must be set up for each one. As a result, enhanced content for one program may continue to be displayed after that program has been interrupted.

It is desirable that there should be an improved way in which the display of enhanced content is synchronised with a video or other signal to which it is related.

According to one aspect of the present invention there is provided a method for controlling presentation of items of enhanced content in an interactive television system comprising at least one distribution unit and a plurality of decoder units arranged to store items of enhanced content and cause them to be presented to a user on receipt of a trigger signal from the distribution unit, the method comprising: storing the items of enhanced content at the decoder units; storing at the distribution unit a schedule indicating a desired synchronisation between the items of enhanced content and a running program with which the enhanced content is associated, the running program comprising a timing stream and a series of periodic indications of the identity of the running program; transmitting the running program to the decoder units over a transmission channel via the distribution unit; and at the distribution unit analysing traffic passing over the transmission channel so as to determine whether the said periodic indications of the identity of the running program continue to be detected as passing over the transmission channel, and generating trigger signals in respect of the enhanced content associated with the running program only whilst it is determined that the said periodic indications continue to be detected as passing over the transmission channel.

According to a second aspect of the present invention there is provided a distribution unit for an interactive television system wherein items of enhanced content can be presented to users, the interactive television system comprising a plurality of decoder units arranged to store items of enhanced content and cause them to be presented to a user on receipt of a trigger signal from the distribution unit, the distribution unit comprising: a store for storing a schedule indicating a desired synchronisation between the items of enhanced content and a running program with which the enhanced content is associated, the running program comprising a timing stream and a series of periodic indications of the identity of the running program; a transmitter for transmitting the running program to the decoder units over a transmission channel; and a traffic analyser for analysing traffic passing over the transmission channel so as to determine whether the said periodic indications of the identity of the running program continue to be detected as passing over the transmission channel, and transmitting such trigger signals only whilst it is determined that the said periodic continue to be detected as passing over the transmission channel.

Preferably the said periodic indications of the identity of the running program are deemed not to continue to be detected if no such indication is detected over an interval greater than a predetermined interval. The predetermined interval may, for example, be equal to once or twice the period of the indications.

Preferably, if the distribution unit determines that the said periodic indications no longer continue to be detected it transmits a halt signal to the decoders, and in response to such a signal the decoders cause the halting presentation of enhanced content associated with the running program.

Preferably the schedule indicates a presentation time for each of the items of enhanced content, and the method comprises the steps of: at the distribution unit analysing a timing stream of traffic passing over the transmission channel, and if the current value of the timing stream matches a value stored in the schedule as the time for presentation of one of the items of enhanced content, and if the said periodic indications of the identity of the running program continue to be detected as passing over the transmission channel, transmitting a trigger signal to the decoders to trigger them to present that one of the items of enhanced content.

The trigger signal suitably includes an indication of the identity of said one of the items of enhanced content. Suitably in response to the trigger signal each of the decoders causes the said one of the items of enhanced content to be presented.

Preferably after the distribution unit has determined that the said periodic indications had no longer continue to be detected, on the distribution unit determining that the said indications it determines that the said indications are again being detected it transmits a signal to the decoders to cause them to present any of the items of enhanced content that should currently be presented according to the schedule.

The enhanced content is suitably transmitted to the decoders via the distribution unit. Preferably the enhanced content, the running program and the trigger signals are transmitted from the distribution unit to the each decoder over the same physical link.

The running program preferably comprises a video stream and/or an audio stream. The video or audio stream is conveniently in a digital format, in which case the timing stream is preferably is a timing stream of the digital format. The digital format may be an MPEG format.

Preferably the running program and the items of enhanced content are presented to the user by the same means. That means is conveniently a television.

The distribution unit may additionally be capable of transmitting trigger signals to the decoder when instructed to do so by a control unit of the distribution system. The distribution unit may be arranged only to transmit such trigger signals only whilst the indications of the identity of the program continue to be received, but this is not essential as it could rely on the control unit to determine that the program is continuing.

Conveniently, the distribution unit provides running program, enhanced content and trigger signals to a plurality of decoders. Such decoders may be of a similar type or located in a similar geographical area.

Conveniently the running program is transmitted to the decoding unit as a stream, and the decoding unit causes each part (e.g. frame) of the running program to be displayed immediately it is received. For instance, the running program could be transmitted to the decoding unit as a video stream on a broadcast video channel.

The present invention will now be described in more detail by way of example with reference to the accompanying drawings in which:

FIG. 4 shows an interactive television network.

Figure 1:
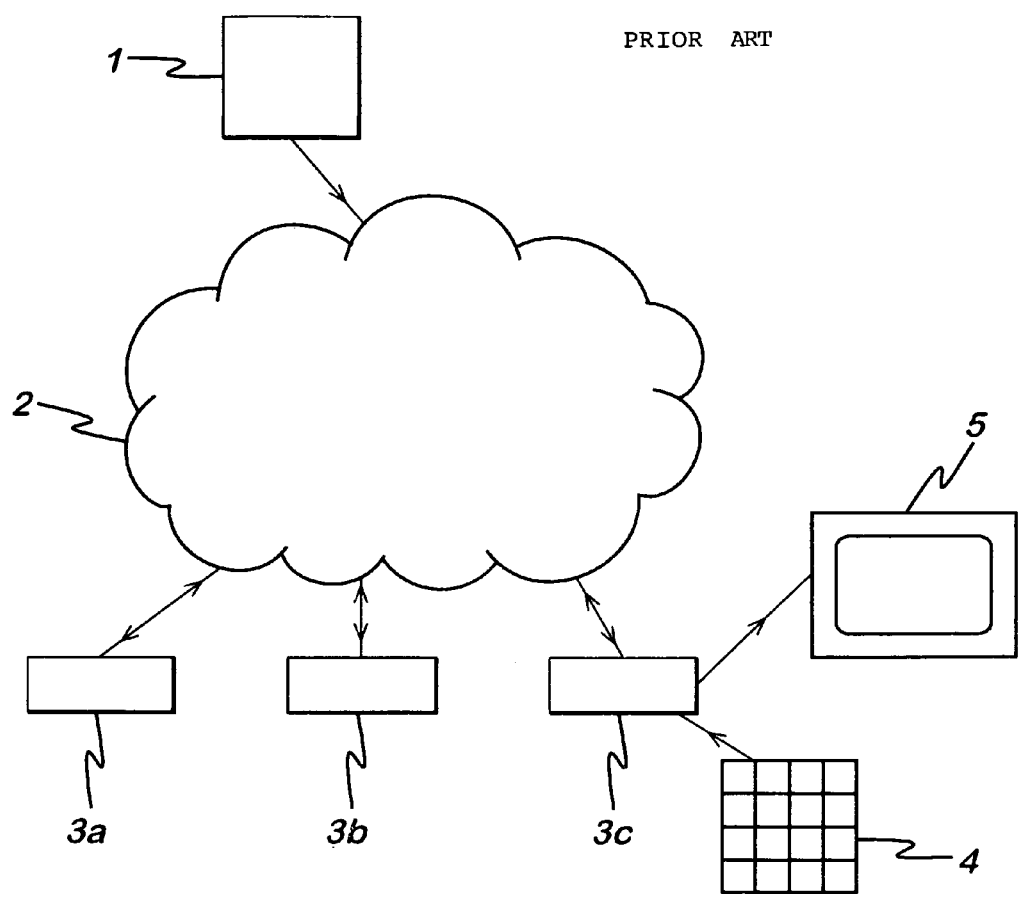
FIG. 1 shows a prior art interactive television system.
Figure 2:
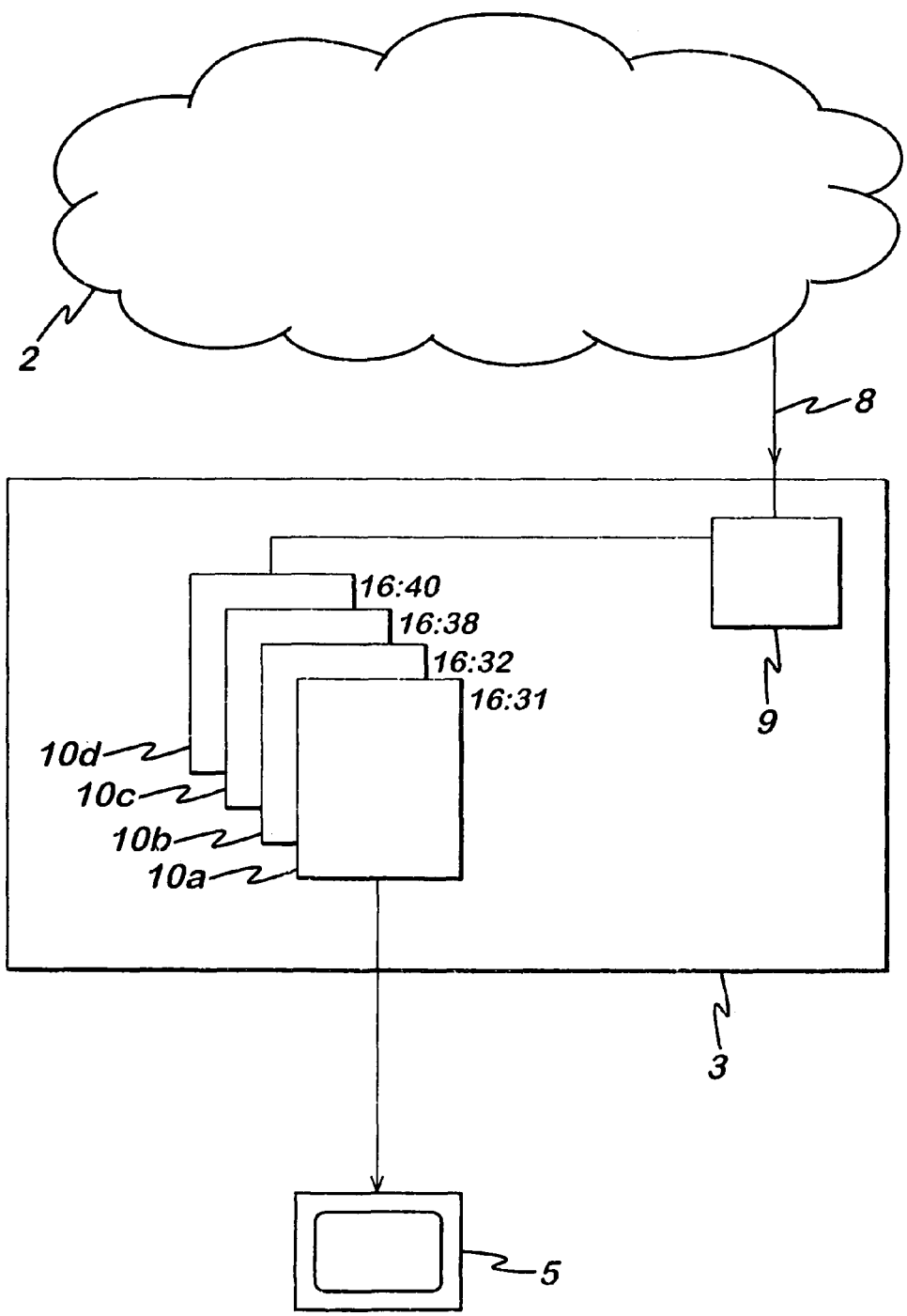
FIG. 2 shows in more detail the decoding arrangement of a prior art interactive television system.
Figure 3:
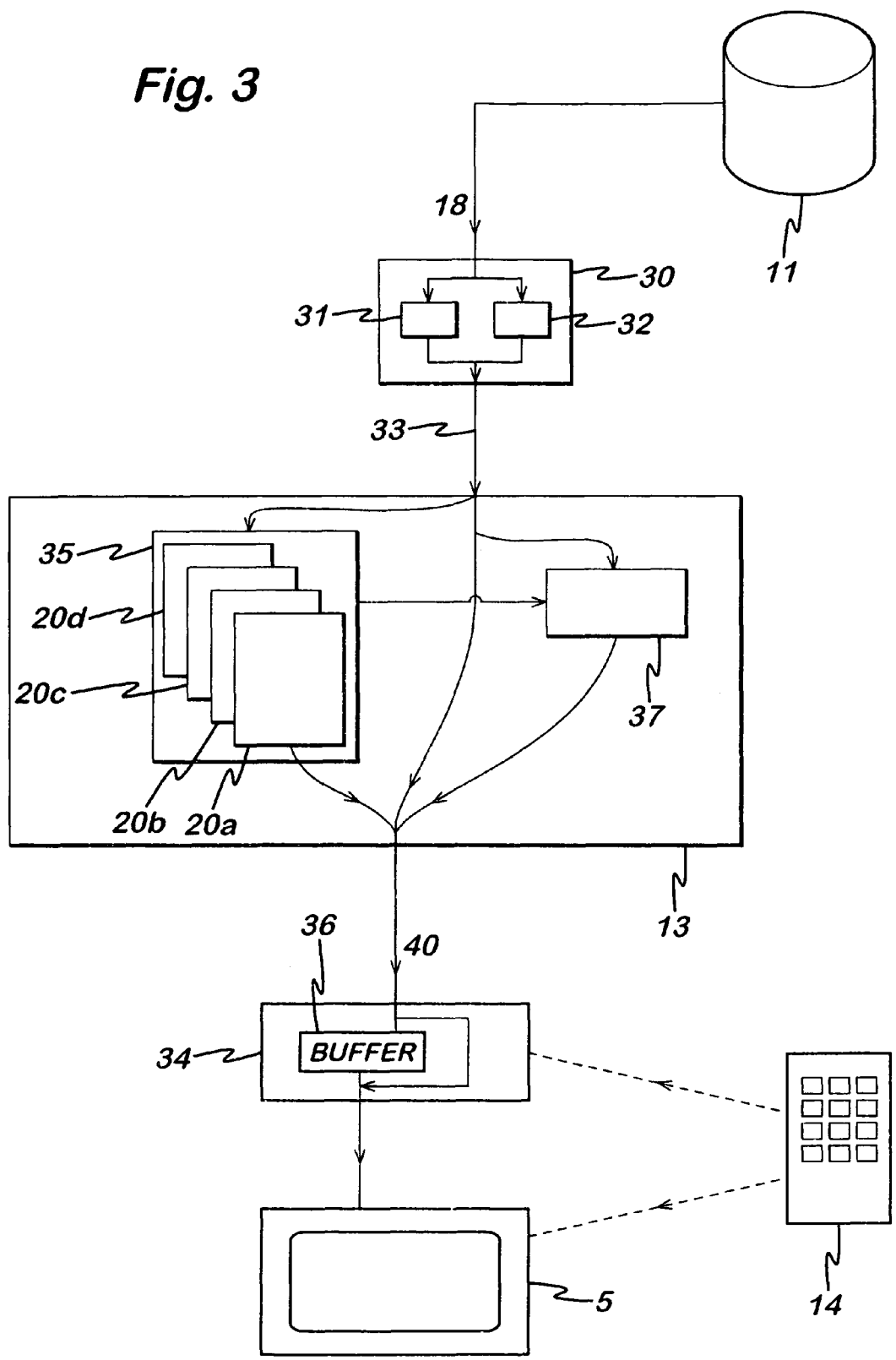
FIG. 3 shows a system for providing and decoding a video stream including enhanced content.

Initially a combined presentation including items of enhanced content and a running program such as a video stream is prepared by a content provider. The content provider also defines a synchronisation schedule which indicates the points relative to the running of the video stream at which each of the items of enhanced content is to be presented (played out) to a user. In the system of FIG. 3 the content provider is indicated at 11.

The synchronisation schedule suitably relates the presentation of some or all of the items of enhanced content to a corresponding time relative to the video stream. Codes are embedded periodically in the video stream. Each code includes a timing field which indicates the time offset between the start of the stream and the point in the stream at which that code is embedded. The synchronisation schedule indicates the time as indicated by the embedded codes at which enhanced content is to be presented. Some of the items of enhanced content could be accessed on demand by a user (for instance by means of hyperlinks from another item of enhanced content) or when a trigger is sent in real time from a producer of the program. These items would not need to have times stored for them.

The content provider 11 transmits the enhanced content, the video stream and the synchronisation schedule over link 18 to a playout management centre (PMC) 30. At the playout management centre certain changes are made to the data to adapt them for successfully being played out over the distribution system of which the playout management centre is a part. In an enhanced content adaptation unit 31 the enhanced content is adapted if necessary so that it can be decoded by the types of decoders (e.g. set-top boxes) that are used in the system. In a video adaptation unit 32 UCC (unified content code) messages are inserted at regular intervals in the video stream. Preferably UCC messages are inserted into the video stream at intervals of one second, or more frequently.

Each UCC message suitably consists of a 15-digit code according to the following layout:

| Pos:  | 15 | 14 | 13 | 12 | 11 | 10 | 9 | 8 | 7 | 6 | 5 | 4 | 3 | 2 | 1  |
|-------|----|----|----|----|----|----|---|---|---|---|---|---|---|---|-----|
| Name: | R  | R  | R  | C  | C  | C  | C | P | P | P | P | P | P | P | CS  |

R: a 3-digit region number conforming to ISO 3166-1
C: a 4-digit company number
P: a 7-digit product number
CS: a 1-digit checksum number conforming to ISO/IEC 15420 Annex A The UCC codes indicate the identity of a program by means of the R, C and P numbers.

Each UCC also includes a timestamp that indicates the timing of that UCC relative to the start of the video stream.

The transformed enhanced content, video stream and synchronisation schedule are transmitted over a link 33 to a media control manager (MCM) 13. The overall distribution system may comprise two or more MCMs, each serving different geographical areas and/or types of decoder.

A number of decoders such as set-top box 34 or digital televisions are connected to the distribution unit 13. Each decoder is capable of decoding received items of enhanced content and video stream and causing them to be presented to a user via presentation means such as television 5. A controller 14 is also available to a user, whereby the user can indicate to the decoder which channel he wishes to receive.

Prior to the time when a presentation is to be placed out to users the enhanced content for the presentation and preferably also the synchronisation schedule for the presentation are transmitted by the playout management centre (PMC) 30 to the Media Control Manager (MCM) 13. At the MCM the synchronisation schedule is stored and the enhanced content can be buffered, if necessary, in buffer 35. Subsequently, the enhanced content is transmitted by the MCM to the decoders that it serves, for instance set-top box (STB) 34, and buffered there, e.g. in buffer 36. Preferably all the enhanced content for the presentation is transmitted to the decoders before the presentation begins, but the enhanced content could be transmitted to the decoders in stages. The decoders can store the enhanced content, but are arranged not to present it until triggered to do so by a trigger signal from the MCM.

When the time comes for the presentation to be played out the video stream is transmitted to the MCM 13 and distributed from there to the decoders. As the video stream is transferred through the MCM a traffic analyser analyses the UCC codes in the video stream and the timing stream of the video stream. The traffic analyser signals the trigger generator to create and broadcast the triggers. The traffic analyser also synchronises the clock used by the trigger generator for the timed trigger broadcasting.

The traffic analyser monitors the UCC codes as they are received while running a presentation or similar program with which enhanced content is associated. Whilst UCC codes, periodic indications indicating the identity of the presentation (or, similar running program with enhanced content), are being received in the video stream the trigger generator is enabled to generate trigger signals for sending over a transmission channel to the decoders while the UCC codes continue to be detected. If the traffic analyser determines that such UCC codes are no longer being received during, for example, a predetermined interval, for example because no such UCC code has been detected for a predetermined period, then it is disabled for generating trigger signals for sending to the decoders in respect of the enhanced content of that presentation. Preferably, the periodic indications of the identity of the running program are deemed not to continue to be detected if no such indication is detected over an interval greater than a predetermined interval. The predetermined interval may, for example, be equal to once or twice the period of the indications. When the traffic analyser determines that such UCC codes are no longer being received, the trigger generator preferably also transmits a signal to the decoders to cause them to disable the play-out of the enhanced content of that presentation.

Whilst the trigger generator is enabled for sending trigger signals in respect of the enhanced content of the presentation the traffic analyser monitors the timing stream of the video stream of the presentation and compares the current value of the timing stream with the timings indicated in the synchronisation schedule. The MCM maintains a clock that is synchronised to the timestamps contained in the UCCs. When the current value of the clock matches a timing indicated in the synchronisation schedule for an item of enhanced data, and the trigger generator is enabled for generating trigger signals, the trigger generator sends a trigger signal to the decoders to trigger them play out that item of enhanced content.

When the video stream is resumed after a break, the trigger generator determines from the synchronisation schedule whether an item of enhanced content should be being presented at the point at which the video stream has resumed. If so, it triggers the decoders to present that item.

In this way, if the video stream of the presentation is interrupted, for example by a commercial break, the playout of the enhanced content of the presentation will also be interrupted since the UCCs of the presentation will stop being received. When the video stream is resumed the UCCs of the presentation will restart and the enhanced content will be resumed.

The decoders are arranged to be responsive to the trigger and halt signals to cause enhanced content to be presented, or to halt presentation of enhanced content respectively.

It is preferred that video stream, enhanced content and the trigger signals are sent to each decoder only in accordance with the channel selection of the decoder's user. Also, a user may select not to have enhanced content presented to him from time to time, for example by configuring his set-top box accordingly.

The presentation of items of enhanced content may also be triggered by their being called by a user using a hyperlink from another item of enhanced content; or by the transmission to the decoders, via the MCM, of an ad hoc trigger signal from a controller at the PMC.

The enhanced content could include video and/or audio data or (if used with a suitable unit for presenting the data to a user) other forms of data. The enhanced content could be defined as pages or clips of information, or in other ways.

FIG. 4 shows an example of a broadcast network in which the present system may be employed.

The network shown in FIG. 4 comprises an Edit Suite 100, a Playout Management Centre 101, a Media Control Manager 102, uplink and downlink stations 103 and 104, a satellite 105, a decoder 106, and a Transaction Management System 107. The decoder 106 may, for example, be a set-top box or a digital television. Each of the components of the system will be described in turn. The components can communicate with each other as indicated by the arrows in FIG. 4.

Interactive content is produced at the Edit Suite 100 (specifically, in a Content Production Manager (CPM)) on generic re-usable templates. The general templates can be manipulated by designers to produce a template with the desired format for a particular application. This specific template can then be saved to the memory of the CPM. Subsequent data can be added easily and quickly to the application-specific template, for example, daily news, weather or TV guides.

Once data has been added to a template at a CPM, the populated template is inputted to an Event Broker Console (EBC), the second stage of an Edit Suite, where it has a stream script added to it.

Meta-data (the UCCs and timestamps described above) is then added to the main broadcast stream (i.e. the video stream) that is associated with the content of the template. The meta-data allows the stream script to be triggered in real-time to synchronise the content with the main broadcast stream. For live television events, the EBC can be used to manage the broadcast of interactive pages, as will be described later.

Following production at the Edit Suite, the template data is passed to a Playout Management Centre (PMC) 101, which converts the data to a signal (representing pages of interactive content) in the relevant format for any platform on which it is to be received and displayed. The PMC can store the interactive content until it is needed. Once the interactive content is required, it is transmitted to a Media Control Manager (MCM) 102. To reach the MCM the interactive content could be sent to an uplink station 103 and transmitted via a satellite 105 to a downlink station 104 or could be sent in another way, for instance by cable.

The MCM 102 is located in a cable TV digital head end. The MCM receives interactive data from a PMC 101, stores it until it is to be played out, and, in response to receiving a trigger, broadcasts it to decoders 106. The decoders could be set-top boxes connected to televisions, or they could be digital televisions.

The MCM can be informed in a number of ways of when to cause a page of interactive content to be played out, by being transmitted from the MCM to the decoder 106, and subsequently displayed. For example, if the television event to which the interactive content is related is being broadcast live, then an editor at an Edit Suite 100 can manually trigger the play-out of the content from the MCMs 102. to ensure that the content is synchronised with an appropriate part of the television event. A trigger would be sent from the Edit Suite 100 to the PMC 101; the PMC would transcode the trigger and forward it to the MCM 102, and then the MCM would broadcast the trigger towards decoders 106. In the case of a live event, meta-data is not added to the content, but instead an engineer directly controls the sending of the (de)activation signal and the triggers according to the images from the main broadcast stream, the activation and deactivation signal respectively initiate and terminate the broadcasting of the enhancements, the triggers are used to trigger the decoder to display the required page.

Alternatively, triggers can be arranged to be sent automatically at pre-determined times during a television event. In this case, the MCM has access to a time schedule and on the basis of this schedule, sends triggers to decoders at the times when it is desired for the interactive content to be played out. For instance, a TV programme might start at 7.30 pm, and triggers could then be sent automatically from the MCM 102 at 7.31 pm, 7.35 pm, 7.42 pm and so on, depending on the parts of the programme with which each page of interactive content is related. As another alternative, markers could be embedded in the video signal associated with a particular set of interactive pages, and triggers could be generated in dependence on the association between the markers and the pages. These markers would be the meta-data referred to above which is added to the video stream.

The MCM 102 can also manage the bandwidth allocated to video signals and interactive content signals according to television events taking place. Content can also be stored/buffered at the MCM.

A Transaction Management System (TMS) 107 is employed to deal with responses of subscribers to the interactive content broadcast. The TMS is capable of handling large numbers of concurrent responses, and can produce, for example, lists of winners of a competition following the subscriber responses. The TMS is linked to the PMC so that information related to subscriber responses can be fed back and inserted into broadcasts from the MCM 102. In addition, the PMC can communicate with the TMS.

For handling payments to action user responses the TMS is linked to a banking system 108. The TMS may send signals to other functions such as a third party fulfilment centre 109 so as to action user responses, for example to fulfill purchases or issue prizes.

Editors at the Edit Suites 100 can communicate with the TMS 107 via PMC 101 in order to determine how the TMS should react to responses sent from subscribers.

In a system as described above with reference to FIG. 4, there would typically be multiple Edit Suites 100, one PMC 101, multiple MCMs 102 distributed geographically across an area served by the network, and one TMS 107, although in future it may be desirable in terms of efficiency to provide multiple PMCs and/or TMSs. Decoders 106 would be positioned locally to individual viewers, for example in their homes or in public buildings.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method for controlling presentation of items of enhanced content in an interactive television system comprising at least one distribution unit and a plurality of decoder units arranged to store items of enhanced content and cause them to be presented to a user on receipt of trigger signals from the distribution unit, the method comprising:
   storing the items of enhanced content at the decoder units;
   storing at the distribution unit a schedule indicating a desired synchronisation between a playout at the decoder units of each of the items of enhanced content and a running program with which the items of enhanced content are associated, the running program comprising a timing stream and a series of periodic indications of the identity of the running program; and
   at the distribution unit analysing traffic passing over the transmission channel so as to determine whether the said periodic indications of the identity of the running program continue to be detected as passing over the transmission channel, and generating at least one trigger signal in respect of each of the items of enhanced content stored at the decoder units associated with the running program only whilst it is determined that the said periodic indications continue to be detected as passing over the transmission channel.

2. A method as claimed in claim 1, wherein the said periodic indications of the identity of the running program are deemed not to continue to be detected if no such indication is detected over an interval greater than a predetermined interval.

3. A method as claimed in claim 2, wherein the predetermined interval is equal to the period of the indications.

4. A method as claimed in claim 2, wherein the predetermined interval is equal to twice the period of the indications.

5. A method as claimed in claim 1, wherein if the distribution unit determines that the said periodic indications no longer continue to be detected it transmits a signal to the decoders, and in response to such a signal the decoders cause the halting of presentation of the items of enhanced content associated with the running program.

6. A method as claimed in claim 1, wherein the schedule indicates a presentation time for each of the items of enhanced content, and the method comprises the steps of:
   at the distribution unit analysing a timing stream of traffic of the running program passing over the transmission channel, and if the current value of the timing stream matches a value stored in the schedule as the time for presentation of one of the items of enhanced content, and if the said periodic indications of the identity of the running program continue to be detected as passing over the transmission channel, transmitting a trigger signal to the decoders to trigger them to present said one of the items of enhanced content.

7. A method as claimed in claim 6, wherein the trigger signal includes an indication of the identity of said one of the items of enhanced content.

8. A method as claimed in claim 7, wherein in response to the trigger signal each of the decoders causes the said one of the items of enhanced content to be presented.

9. A method as claimed in claim 1, wherein after the distribution unit has determined that the said periodic indications no longer continue to be detected, on the distribution unit determining that the said indications it determines are again being detected it transmits a signal to the decoders to cause them to present any of the items of enhanced content that should currently be presented according to the schedule.

10. A method as claimed in claim 1, wherein the enhanced content is transmitted to the decoders via the distribution unit.

11. A method as claimed in claim 10, wherein the enhanced content, the running program and the trigger signals are transmitted from the distribution unit to the or each decoder over the same physical link.

12. A method as claimed in claim 1, wherein the running program comprises a video stream.

13. A method as claimed in claim 12, wherein the running program comprises an audio stream.

14. A method as claimed in claim 13, wherein the video or audio stream is in a digital format and the timing stream is a timing stream of the digital format.

15. A method as claimed in claim 1, wherein the running program and the items of enhanced content are presented to the user by the same means.

16. A method as claimed in claim 15, wherein that means is a television.

17. A distribution unit for an interactive television system wherein items of enhanced content can be presented to users, the interactive television system comprising a plurality of decoder units arranged to store items of enhanced content and cause them to be presented to a user on receipt of trigger signals from the distribution unit, the distribution unit comprising:

a store for storing a schedule indicating a desired synchronisation between a playout at the decoder units of each of the items of enhanced content and a running program with which the items of enhanced content are associated, the running program comprising a timing stream and a series of periodic indications of the identity of the running program;

a transmitter for transmitting the running program to the decoder units over a transmission channel; and a traffic analyser for analysing traffic passing over the transmission channel so as to determine whether the said periodic indications of the identity of the running program continue to be detected as passing over the transmission channel, and transmitting at least one trigger signal in respect of each of the items of enhanced content stored at the decoder units associated with the running program only whilst it is determined that the said periodic indications continue to be detected as passing over the transmission channel.

* * * * *